United States Patent Office 3,613,246
Patented Oct. 19, 1971

3,613,246
MOUTH MIRROR
Eduard Zdarsky, 6 Oberfohringer Strasse,
Munich, Germany
Original application May 3, 1966, Ser. No. 547,330.
Divided and this application Sept. 30, 1969, Ser.
No. 871,108
Int. Cl. A61c 3/00
U.S. Cl. 32—69        7 Claims

ABSTRACT OF THE DISCLOSURE

A dental mirror is composed of a mirror body, a flexible intermediate plate and a mounting plate, all three elements being of approximately the same diameter; the intermediate plate and mirror body being bonded to each other only at their peripheries, while the intermediate plate is secured to the mounting plate by means of a central connecting means which exerts force to pull the rim of the intermediate plate into abutting engagement with the rim of the mounting; the flexibility of the intermediate plate permitting slight misalignment of the central connecting means while ensuring a close fit around the periphery.

---

This application is a division of my co-pending application, Ser. No. 547,330, filed May 3, 1966 for Mouth Mirror and now abandoned.

The present invention concerns a mouth mirror for medical purposes, more especially for dental purposes.

It is known for mouth mirrors to be designed multisectionally, so as to make it possible to replace the vulnerable mirror part. For this reason, the mouth mirrors are therefore equipped with a handle that can be unscrewed from the frame carrying the mirror body. Since, however, even the mirror frame together with the shank is itself still comparatively expensive, whereas, on the other hand, only the mirror body is subject to wear and tear, it has already been suggested that the mirror glass piece be replaceably fastened in or on the frame. In a known embodiment, this is achieved by the use of an attractive magnet, which is mounted in the frame. In this instance, fastened on the rear of the mirror glasspiece is a magnetisable metal coating which interacts with the metallic frame plate. However, this formation increases the cost of the manufacture of the total construction. In addition, the application of the metallic magnetic layer is complicated, and the magnetic attraction effect is not sufficient by itself, so that additional enclosing walls are needed on the frame plate in order to prevent the glass piece from shifting sideways. In their turn, such enclosing walls tend to lead to the mirror becoming dirty and make it difficult to clean. Mirrors designed in such a manner did not gain practical acceptance and, as before, only mouth mirrors having a rigidly fastened glass piece and frame plate are now available.

It is an object of the invention, therefore, to provide a mouth mirror whose mirror body is replaceable at will. To achieve this purpose, the present invention provides a mouth mirror for medical and dental purposes comprising a high-grade mirror body, a mounting plate, a shank extending from said mounting plate and rotational means releasably mounting said mirror body on said mounting plate.

One advantageous embodiment makes provision for a screw connection as the connecting means, whereby the mounting plate is provided with a central screw bolt and the mirror body is provided with a tapped hole, or vice versa. So that one of the screw parts can be mounted on the mirror body, this latter generally consisting of a mirror glass piece, without danger to the mirror body, according to a further feature a metal disc, which then carries this screw part, is fastened on the rear of the mirror body. So as to ensure a secure and tight seal between the mounting plate and the mirror body that can be screwed on, the mounting plate can be arched in such a way as to give rise to a narrow pressing seat, which alone comes into contact with the mirror body. Advantageously, the shape of the metal part fastened on the mirror body is then adapted to that of the mounting plate. The metal disc is advantageously made of a good heat-conducting material, for example copper or brass. It serves at the same time as a heat carrier, which, to prevent the glass piece from fogging, conducts the absorbed heat to this latter.

In another embodiment, the screw bolt is fastened to a thin metal disc cemented to the mirror body, and the tapped hole is provided in the mounting plate. This metal disc is preferably not cemented over its entire surface to the mirror body, but only peripherally, so that this disc is flexible in the region of the screw bolt. The flexibility of the disc can be further increased by providing grooves therein. These measures have the advantage of adaptability in the case of screwing cants and deviations in the geometric shape of the mirror body, as well as the advantage of a dependable sealing between the connecting parts, more especially if the mounting plate is also grooved. In the case of this type of connection, the necessary mass for heat storage purposes can be provided in the mounting plate.

The construction of the mouth mirror is particularly easy if mounting plate and shank are made of one stamped metal part, with the curvature and/or the threaded hole being formed therein during the stamping operation.

The mouth mirror according to the invention is simple in construction and therefore also cheap to manufacture. The mouth mirror reflecting part can easily be unscrewed from the mounting plate merely by a twist of the fingers, and be exchanged for a new one. When the reflector surface or the mirror body part respectively become damaged, only this part, and not the mounting plate plus shank as well, is lost.

The present invention will be described further, by way of example, with reference to various forms of mouth mirror according to the present invention as illustrated in the accompanying drawings, in which.

Figure 1:
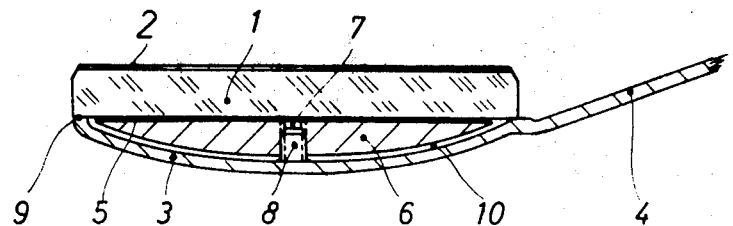
FIG. 1 is a sectional view through a first form of mouth mirror according to the invention.

The mouth mirror as shown in FIG. 1 consists of a mirror glass piece 1 having a mirror coating 2 on its surface, as well as a mounting plate 3 having a shank 4. The thread at the end of this shank, intended for a conventional handle to be screwed thereon, is not visible in the drawings. Adhering to the rear of the mirror glass piece 1 by means of an adhesive layer 5 is a metal disc 6 of somewhat lenticular cross section. Instead of this adhesive connection, an ultrasonic weld can also for example be carried out. In the centre of this metal disc 6 is a tapped hole 7, into which a screw bolt 8 of the mounting plate 3 engages. The mounting plate is concavely arched and formed at the rim into a pressing edge 9. This pressing edge is intentionally kept narrow, so as to obtain an adaptable and thereby tight contact against the mirror glass piece.

Figure 2:
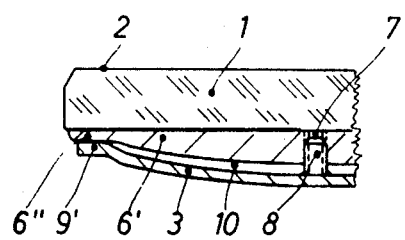
FIG. 2 is a detail sectional view through the mirror of FIG. 1, but showing an intermediate sealing layer.

Shown in FIG. 2 is a mouth mirror which again consists of a glass piece 1 having a mirror coating 2, as well as a mounting plate 3. The rear of the mirror glass piece carries a metal disc 6', which in this instance extends right up to the edge of the glass piece and is flattened in the rim zone 6'', so as to give a good seat for the pressing edge 9' of the mounting plate. As in the case of the mouth mirror as shown in FIG. 1, the connection again takes place by means of a bolt 8 and a screw hole 7. For functional efficiency, soft material, such as copper or brass, will be chosen for the metal disc. This soft metal then forms, in the bolted state, a really tight seal.

In the embodiments of FIGS. 1 and 2, the mounting plate is of relatively large curvature and the metal disc is of appreciable size. This is because the metal disc is, at the same time, to serve as a heat carrier. As is known, prior to their being inserted into the oral cavity, the mouth mirrors are heated by their reverse side being approached to a flame. The metal disc 6, 6' is also thereby heated and transfers its heat potential uniformly to the glass piece. So as largely to eliminate heat conduction to the mounting plate, care is taken to see that an air gap 10 is left for heat insulation between the disc and the mounting plate.

Figure 3:
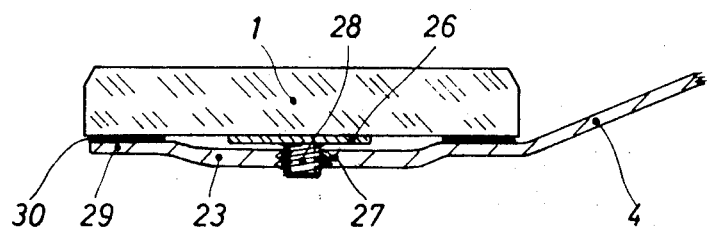
FIG. 3 is a sectional view through a second form of mouth mirror according to the invention.
Figure 4:
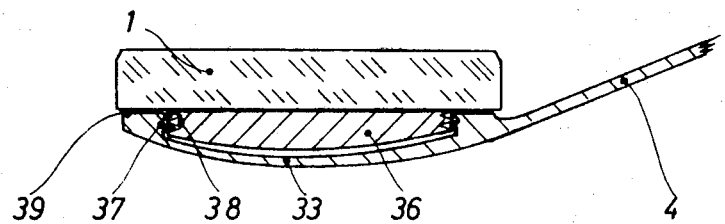
FIG. 4 is a sectional view through a third form of mouth mirror according to the invention.

In the case of the mouth mirror shown in FIG. 3, the screw bolt 28 is fastened to the mirror glass piece 1 by means of a base plate 26. The screw hole 27 is in this instance in the mounting plate 23, which can now be of smaller curvature than that of the mirror of FIGS. 1 and 2. This mounting plate has on its edge a comparatively wide pressing edge 29. A sealing ring 30 made of a suitable soft material applied in a suitable manner to the mounting plate, can be provided to make a better joint.

Figure 5:
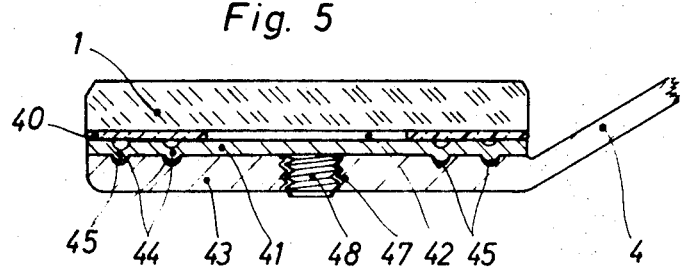
FIG. 5 is a sectional view through a fourth form of mouth mirror according to the invention.

A further similar coupling method is shown in FIG. 5. Cemented to the mirror glass piece 1 by means of an adhesive layer 40 is a thin diaphragm-like metal plate 41. This plate carries in its centre the screw bolt 48, which engages as before into a tapped hole 47 of the mounting plate 43. The metal plate this time covers the entire rear face of the mirror, but it is not cemented to this entire surface, but a zone 42 is left untouched by adhesive in the region of the screw bolt. Finally, the metal or diaphragm plate 41 is provided with grooves 44, which engage in annular grooves 45 of the mounting plate. Because of the partial cementing and the grooves, this diaphragm plate 41 is very elastic and flexible, thus giving rise to a dependable and tight screw coupling. By virtue of the flexible plate, the screw bolt itself can yield in all directions, whereby inequalities of the mirror body, which is not always of an exact shape, can be compensated for. Also, upon being screwed, the screw bolt can be aligned with the thread or, because of the shortness of the thread length, a screw coupling is possible even in a canted position, if at any time the mirror body is not superimposed in the correct position onto the mounting plate.

In the case of this screw bolt mounting, the mounting plate can be reinforced to form a heat reservoir.

Figure 6:
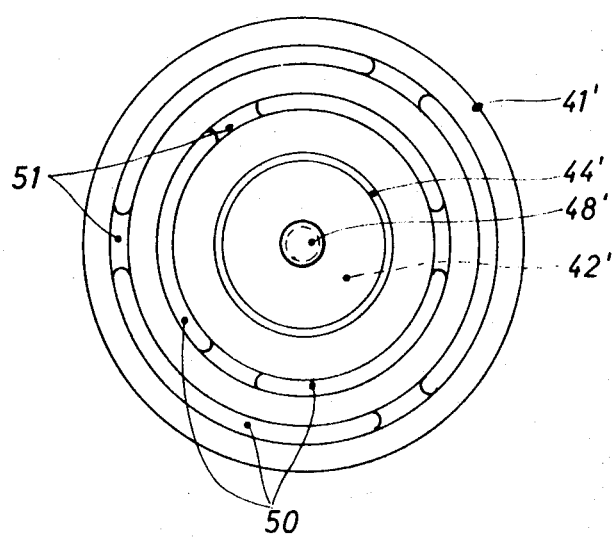
FIG. 6 is a bottom plan view of a different form of metal plate.

FIG. 6 shows another type of diaphragm plate 41', having the screw bolt 48'. In this instance, only one inner groove 44' is formed therein, which can at the same time serve to localise the zone 42' free from adhesive. Moreover, this plate has annular notches 50, which are broken by short intermediate webs 51. If a plurality of such annular notches are provided, then the intermediate webs 51, which advantageously are also grooved, are staggered.

A diaphragm plate designed in this manner can better adapt itself to changes in expansion if fairly large stresses should arise between glass and metal as a result of temperature variations, such as occur during heating or sterilising.

Figure 7:
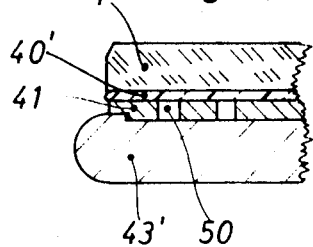
FIG. 7 is a detail sectional view of a mirror having a butt edge.

The mirror portrayed in FIG. 7 is, for example, equipped with a diaphragm plate 41'. Unlike the mirrors shown previously and having a flush rim design, the mounting plate 43' this time juts out and forms a butt edge, so that the glass piece itself is better protected.

I claim:

1. A mouth mirror for medical and dental purposes comprising a mirror body, a flexible intermediate plate, and a mounting plate, said elements being of substantially the same diameter, the back of the mirror body and one side of the intermediate plate being adhesively secured to each other only along their abutting peripheral areas, and threaded coupling means connected between a central portion of the intermediate plate and the mounting plate to hold the peripheral areas of the mounting plate in closely abutting engagement with the peripheral area of the mirror body and intermediate plate, said flexible intermediate plate permitting slight misalignment of the coupling means.

2. The invention as defined in claim 1, wherein said coupling means includes an internally threaded socket and a threaded bolt engaged in said socket, one of said two last-mentioned elements being secured to the center of said mounting plate, the other of said elements being secured to the center of the flexible intermediate plate.

3. The invention as defined in claim 2, wherein said mounting plate is provided with a narrow peripheral rim projecting upwardly towards said mirror body.

4. The invention as defined in claim 2, wherein said intermediate plate comprises a sheet of metal, said sheet being indented to provide a series of annular concentric ridges projecting towards said mounting plate, said mounting plate being provided with complementary annular grooves into which said ridges are received.

5. The invention as defined in claim 2, wherein said intermediate plate comprises a sheet of metal, said sheet being provided with a series of arcuate concentrically disposed slotted openings, each said opening extending over portions of a complete arc to provide a series of radial webs between portions to increase the flexibility of the intermediate plate as a whole.

6. The invention as defined in claim 5, wherein a first series of said slotted openings separated by radial webs is provided at a first distance from the center of the intermediate plate and a second series of slotted openings separated by radial webs is provided at a second distance from said center, the webs of said first series being circumferentially spaced from the webs of the second series of openings.

7. The invention as defined in claim 6, wherein said intermediate plate is also indented to provide at least one annular concentric ridge projecting toward said mounting plate, said mounting plate being provided with a complementary annular groove.

References Cited

UNITED STATES PATENTS 1,086,887    2/1914    Bittman      32—69

FOREIGN PATENTS 611,624    11/1948    Great Britain      32—69

ROBERT PESHOCK, Primary Examiner